US006439995B1

(12) United States Patent
Hughs-Baird et al.

(10) Patent No.: US 6,439,995 B1
(45) Date of Patent: Aug. 27, 2002

(54) GAMING DEVICE HAVING A BONUS SCHEME WITH MULTIPLE SELECTION GROUPS

(75) Inventors: Andrea C. Hughs-Baird; Paulina Glavich, both of Reno; Bayard S. Webb, Sparks; Anthony J. Baerlocher, Reno, all of NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 09/656,702

(22) Filed: Sep. 7, 2000

(51) Int. Cl.[7] ............................ A63F 13/00; A63F 9/24

(52) U.S. Cl. ......................... 463/20; 463/25; 273/138.1

(58) Field of Search .......................... 163/1, 2, 7, 9–13, 163/16–21, 25, 30, 31, 36–38; 273/138.1, 139, 236, 237, 242; 283/903

(56) References Cited

U.S. PATENT DOCUMENTS

| | | | | | |
|---|---|---|---|---|---|
| 4,182,515 | A | * | 1/1980 | Nemeth | 273/138.1 |
| 5,046,737 | A | * | 9/1991 | Fienberg | 273/139 |
| 5,449,173 | A | | 9/1995 | Thomas et al. | |
| 5,647,798 | A | * | 7/1997 | Falciglia | 463/19 |
| 5,743,524 | A | * | 4/1998 | Nannicola | 273/139 |
| 5,788,573 | A | * | 8/1998 | Baerlocher et al. | 463/16 |
| 5,997,401 | A | | 12/1999 | Crawford | |
| 6,004,207 | A | | 12/1999 | Wilson, Jr. et al. | |
| 6,016,338 | A | * | 1/2000 | Bansal et al. | 463/17 |
| 6,033,307 | A | | 3/2000 | Vancura | |
| 6,045,129 | A | * | 4/2000 | Cooper et al. | 463/13 |
| 6,059,289 | A | | 5/2000 | Vancura | |
| 6,089,976 | A | | 7/2000 | Schneider et al. | |
| 6,089,977 | A | | 7/2000 | Bennett | |
| 6,093,102 | A | | 7/2000 | Bennett | |
| 6,102,798 | A | | 8/2000 | Bennett | |
| 6,126,542 | A | | 10/2000 | Fier | |
| 6,149,156 | A | * | 11/2000 | Feola | 273/292 |
| 6,186,894 | B1 | * | 2/2001 | Mayeroff | 463/20 |
| 6,190,255 | B1 | * | 2/2001 | Thomas et al. | 463/20 |
| 6,224,483 | B1 | * | 5/2001 | Mayeroff | 463/20 |
| 6,270,409 | B1 | * | 8/2001 | Shuster | 463/20 |

FOREIGN PATENT DOCUMENTS

| | | | |
|---|---|---|---|
| EP | 0874337 | A1 | 10/1998 |
| EP | 0945837 | A2 | 3/1999 |
| EP | 0926645 | A2 | 6/1999 |
| EP | 0984409 | A2 | 3/2000 |

OTHER PUBLICATIONS

Top Dollar Brochure published by IGT in 1998.

Sphinx Brochure published by Atronic Casino Technology, Ltd. in 1997.

Spin Til You Win Information Sheet published by IGT in 1996.

Run For Your Money Game Brochures (and Description) published by Barcrest.

* cited by examiner

*Primary Examiner*—Mark Sager
*Assistant Examiner*—Steven Ashburn
(74) *Attorney, Agent, or Firm*—Bell, Boyd & Lloyd LLC

(57) ABSTRACT

The apparatus and method of the present invention provides a gaming device having a bonus round with multiple selection groups. The bonus round does not end upon an "end-bonus" selection; rather, the bonus round ends upon the selection of a predetermined number of selections from the last or final selection group. In one embodiment of the present invention, the number of selections is determined from a selection group preceding the final selection group. Prior to determining the number of final selection group picks, the present invention provides the player with at least one selection group in which the player selects award indicators until selecting an indicator that advances the player to the next selection group. Player excitement and enjoyment is enhanced because the present invention provides the player with multiple opportunities to achieve game credits and because the player is guaranteed to have at least one opportunity to select from the final selection group. In one embodiment of the present invention, the final selection group has larger values than the previous selection groups.

72 Claims, 8 Drawing Sheets

GAMING DEVICE HAVING A BONUS SCHEME WITH MULTIPLE SELECTION GROUPS

CROSS REFERENCE TO RELATED APPLICATION

This application is related to the following commonly-owned co-pending patent applications: "GAMING DEVICE HAVING MULTIPLE AWARD ENHANCING LEVELS," "GAMING DEVICE WITH PRIZE BONUS SCHEME HAVING MULTIPLE AWARD LEVELS," Ser. No. 09/602,140, "GAMING DEVICE HAVING A MULTIPLE SELECTION GROUP BONUS ROUND," Ser. No. 09/605,107, "GAMING DEVICE HAVING A MULTIPLE SCREEN BONUS ROUND," Ser. No. 09/629,235, "GAMING DEVICE HAVING DIRECTIONAL BONUS SCHEME," Ser. No. 09/679,499, "GAMING DEVICE HAVING APPARATUS AND METHOD FOR PRODUCING AN AWARD THROUGH AWARD ELIMINATION OR REPLACEMENT," Ser. No. 09/686,283, "GAMING DEVICE HAVING AN AWARD EXCHANGE BONUS ROUND AND METHOD FOR REVEALING AWARD EXCHANGE POSSIBILITIES," Ser. No. 09/689,510, "GAMING DEVICE HAVING A MULTI-ROUND BONUS SCHEME WHEREIN EACH ROUND HAS A PROBABILITY OF SUCCESS," Ser. No. 09/688,441, "GAMING DEVICE HAVING MULTIPLE CHOICE LARGE AWARD BONUS SCHEME," Ser. No. 09/686,284, "GAMING DEVICE HAVING A MULTIPLE SELECTION SET BONUS SCHEME," Ser. No. 09/680,592, "GAMING DEVICE HAVING RELATED MULTI-GAME BONUS SCHEME," Ser. No. 09/688,972, "GAMING DEVICE WITH A BONUS SCHEME HAVING REPEATED SELECTION OF VALUE SETS WITH OPTION TO SAVE VALUES," Ser. No. 09/684,533, "GAMING DEVICE HAVING A MULTIPLE SELECTION AND AWARD DISTRIBUTION BONUS SCHEME," Ser. No. 09/688,635, "GAMING DEVICE HAVING AN ELEMENT AND ELEMENT GROUP SELECTION AND ELIMINATION BONUS SCHEME," Ser. No. 09/689,381, and "GAMING DEVICE HAVING IMPROVED OFFER AND ACCEPTANCE BONUS SCHEME," Ser. No. 09/680,630.

A portion of the disclosure of this patent document contains material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and in particular to a gaming device having a bonus scheme with multiple selection groups which increase player excitement and enjoyment.

BACKGROUND OF THE INVENTION

Gaming machines currently exist with bonus schemes in which the player has one or more opportunities to choose a particular selection or symbol from a group of symbols. The symbols may be any symbol or image such as a number, letter or graphical representation of a person, place or thing. When a player chooses a symbol, existing games will either award the player a bonus value or terminate the bonus round. The outcome depends upon the particular symbol selected by the player.

In existing games, when the player selects a symbol that awards a bonus value (hereinafter referred to as "award indicator"), the player receives the value, and the player has another chance to select another symbol. Each time the player selects an award indicator, the game prompts the player to make another selection. The bonus round continues and the player may choose another symbol. The player then selects another symbol, and this process continues until the player selects a symbol which terminates the bonus round (hereinafter referred to as an "end-bonus indicator").

When the player selects an end-bonus indicator, typically the game displays a message such as "COLLECT." This message means that the bonus round has terminated, and the player collects any bonus values the player accumulated.

Gaming machines with this type of bonus scheme are programmed so that in each bonus round a certain number of symbols are award indicators and a certain number of symbols are end-bonus indicators. For example, European Patent Application No. EP 0 945 837 A2 filed on Mar. 18, 1999, which is assigned on its face to WMS Gaming, Inc. discloses a bonus scheme generally of this type. This application discloses a bonus scheme where the player selects "value-associated outcomes" from a bonus game with a finite number of selections until selecting an "end-bonus" outcome. While this bonus scheme offers advantages in player appeal and excitement, there is a continuing need to develop new types of bonus games, which further enhance the level of player excitement and enjoyment.

SUMMARY OF THE INVENTION

The apparatus and method of the present invention provides a gaming device having a bonus round with multiple selection groups. The bonus round does not end upon an end-bonus indicator; rather, the bonus round ends when the player chooses a predetermined number of selections from the last or final selection group. The last or final selection group includes an award indicator associated with each selection. In one preferred embodiment of the present invention, the number of player choices or picks in the final selection group (referred to herein as "final selection group picks" or "picks") is determined from a selection group preceding the final selection group. However, it should be appreciated that the number of picks could be determined in any suitable manner.

More specifically, each bonus round of the bonus scheme of the present invention consists of at least one and possibly many displays. Each display may contain one or more selection groups. There are generally two types of selection groups: (i) a final selection group that preferably contains only award indicators; and all other (ii) selection groups that contain award indicators and other types of indicators. There are generally three types of indicators: (i) indicators showing game credits or a bonus value or award (herein referred to as "award indicators"); (ii) indicators advancing a player to another selection group (herein referred to as "advance indicators"); and (iii) indicators designating the number of picks the player has from the final selection group (herein referred to as "picks indicators"). It should be appreciated that in certain embodiments of the present invention, the award, advance and picks indicators could be combined. The indicators are initially masked by symbols or indicia, and the masked indicia are referred to herein as a "selection" or "selections." When a player chooses a selection, the game removes the indicia and displays or exhibits the indicator to the player.

The initial selection groups preferably contain award indicators and at least one advance indicator. There may be any number of initial selection groups. The number depends upon a bonus round theme designed to further enhance player excitement and enjoyment. Likewise, the game theme determines the number of indicators that any of the above mentioned groups contain. The selection group prior to the final selection group preferably contains at least one award indicator and at least one picks indicator. The final selection group only contains award indicators, which preferably have, on average, higher values than the prior selection groups.

Accordingly, prior to determining the number of picks, the preferred embodiment of the present invention provides the player with at least one selection group in which the player chooses selections which are award indicators until the player chooses an advance indicator that advances the player to the next selection group. Player excitement and enjoyment is enhanced because the present invention provides the player with multiple opportunities to achieve game credits and because the player is guaranteed to have at least one opportunity to select from the final selection group. In one embodiment of the present invention, the final selection group has larger values than the previous selection groups.

In one embodiment, all of the selection groups are contained in one display shown on a video monitor. In another embodiment, the bonus round employs multiple displays, one after another, which may contain one or more selection groups. The game theme determines whether the bonus round employs one or several displays.

In one preferred embodiment, the player selects award indicators from at least one initial selection group until the player selects an advance indicator and moves on to another selection group. When the player is at the selection group prior to the final selection group, the player selects award indicators until the player selects a picks indicator, which determines the number of picks the player will have from the final selection group. The player makes the predetermined number of picks from the final selection group which terminates the bonus round. A separate bonus meter and credit display update the player's game credit accumulation during the bonus round and the player's total credits, respectively. When the bonus round ends, the player returns to the normal operation of the gaming device.

In another embodiment, the player initially selects award indicators from a selection group (containing a picks indicator) until the player selects the picks indicator. The player then advances through a number of selection groups containing award indicators and advance indicators until reaching the final selection group.

In another embodiment of the present invention, the bonus scheme contains multiple selection groups that have picks indicators. The selection groups containing picks indicators could also contain advance indicators. In this embodiment, the game accumulates the bonus picks, which could be shown on a separate meter or counter, until the player advances to the final selection group.

In a further embodiment of the present invention, the bonus round does not terminate upon selection from the final selection group if a contingency occurs. For instance, if the player's bonus credit at the end of the round is below a predetermined limit, the game provides the player with another round of selection groups including a final selection group. It should be appreciated that all of the embodiments of the present invention preferably terminate with a final selection group that contains only award indicators.

It is therefore an object of the present invention to provide a gaming device having a bonus round that provides a player with multiple opportunities to achieve game credits and to guarantee the player of having at least one opportunity to select from a final selection group.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Figure 1:
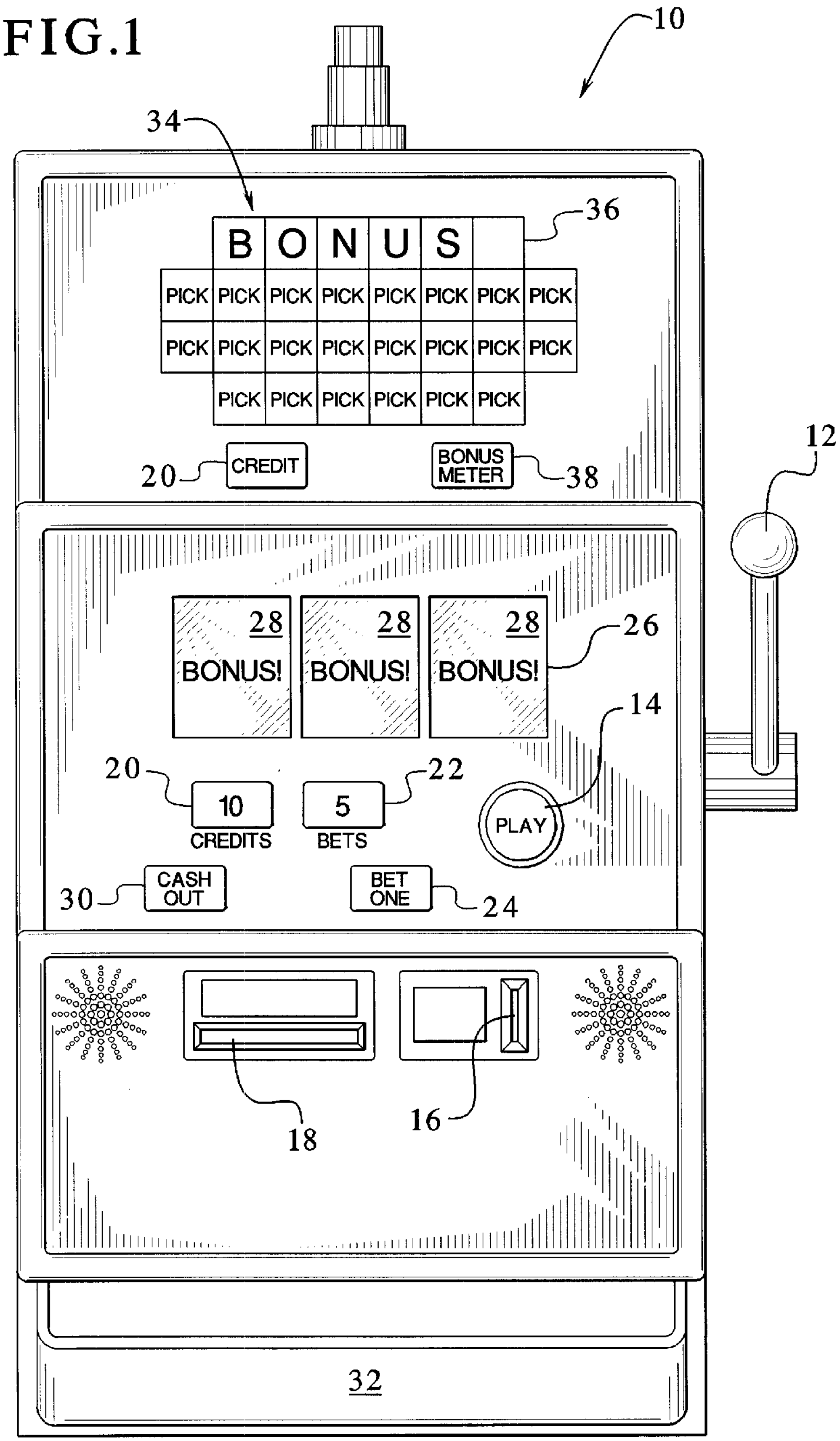
FIG. 1 is a front elevational view of a gaming device having a bonus round with multiple selection groups.

Referring now to the drawings, FIG. 1 generally illustrates a gaming device or "game" commonly referred to as a slot machine, which incorporates the bonus scheme of the present invention. A player may play the slot machine 10 by pulling an arm 12 or by pushing a play button 14. The player operates the slot machine 10 by placing coins in the coin slot 16 or paper money in the bill acceptor 18. Other devices for accepting payment such as readers or validators for credit cards or debt cards could be used. When a player puts money in the slot machine 10, a number of credits corresponding to the amount deposited is shown in a credit display 20.

The slot machine 10 also includes a bet display 22 and a bet one button 24. The player places a bet by pushing the bet one button 24 and increases the bet by one credit each time the player pushes the bet one button 24. When the player pushes the bet one button 24, the number of credits shown in the credit display 20 decreases by one, and the number of credits shown in the bet display 22 increases by one.

The slot machine 10 has a payout display 26 that contains a plurality of reels 28. Slot machines commonly employ three to five reels that are either mechanical or simulated. Each reel has a plurality of indicia such as bells, hearts, fruits, numbers, letters, bars, etc. that preferably correspond to a theme associated with the slot machine 10. When the player pulls the arm 12 or pushes the play button 14, the reels 28 begin to spin. The reels spin until the processor or controller of the slot machine 10 halts the reels individually or in any combination programmed into the controller. When all the reels stop spinning, the combination of indicia from each reel triggers a bonus round if the combination matches a combination programmed into the controller. FIG. 1 illustrates a possible triggering combination wherein all the reels of the payout display 26 show indicia containing the word "BONUS." It should be appreciated that any combination of indicia could be programmed into the controller of the slot machine 10 to trigger the bonus round.

A player may "cash out" and thereby receive a number of coins corresponding to the number of credits at any time by pushing a cash out button 30. When the player "cashes out," the player receives the coins in a coin payout tray 32. The slot machine 10 may employ other payout mechanisms such as credit slips redeemable by a cashier or electronically recordable cards that keep tract of the player's credits. It should also be appreciated that while the bonus scheme of the present invention will be described for use with a slot machine, other gaming devices such as a video card game could employ the bonus scheme of the present invention.

Bonus Scheme Components

Referring still to FIG. 1, the bonus scheme of the present invention, generally indicated by the number 34, includes a controller described below, a display 36, a bonus meter display 38, and the credit display 20, described above. Alternatively, the bonus scheme could function without either the bonus meter or the credit display. A single, a plurality, or all of the selection groups may appear on a single screen or display or multiple screens or displays.

The bonus scheme 34 may contain one or more rounds. Each round contains at least two selection groups, including a final selection group. Each selection group contains a plurality of selections that remain masked until chosen by a player. The number of rounds, the number of selection groups per round, and the number of selections per selection group may vary as desired by the implementor of the gaming device to maximize player excitement and enjoyment. The rounds, the selection groups, and the selections are discussed in detail below.

Figure 2:
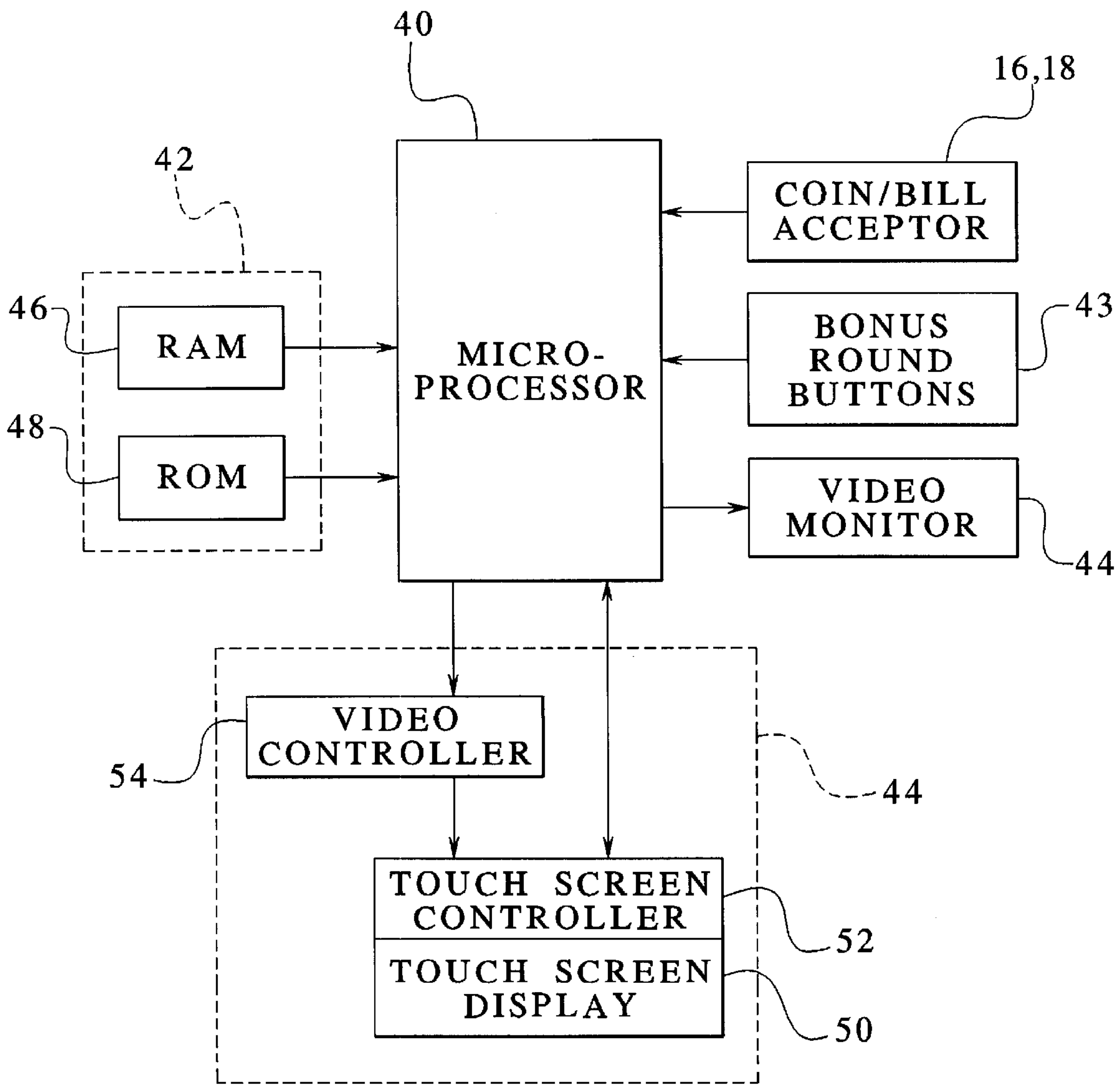
FIG. 2 is a schematic diagram of the controller of one embodiment of the present invention.

The controller of slot machine 10 preferably has the electronic configuration generally illustrated in FIG. 2, which includes: a processor 40; a memory device 42 for storing program code or other data; a video monitor 44 such as a cathode ray tube ("CRT") or a liquid crystal display ("LCD") for displaying items such as the selection groups; and at least one input device such as the arm 12, the play button 14, the bet one button 24, and the cash out button 30. In the present invention, the controller determines the random positions and the values for the selections in the various selection groups. The controller preferably maintains the placement of the selections until the bonus rounds end. The controller preferably determines and maintains a different random positioning each time the player plays the bonus round.

The processor 40 is preferably a microprocessor or microcontroller-based platform which is capable of displaying images, symbols and other indicia such as images of people, characters, places, things and faces of cards. The processor 40 can control the coin slot 16 and the bill acceptor 18 and be programmed to require the player to deposit a certain amount of money to start the game. The memory device 42 typically includes random access memory ("RAM") 46 for storing event data or other data generated or used during a particular game. The memory device 42 can also include read only memory ("ROM") 48 to store program code so that slot machine 10 plays a particular game in accordance with applicable game rules and pay tables.

The game could employ separate electromechanical bonus round buttons shown only figuratively in block 43 to input signals from the bonus round into the processor 40. In this embodiment, video monitor 44 would merely display the display screens, selection groups, and selections and would also show the indicators when the player unmasks a selection. However, it is preferable that a touch screen 50 and an associated touch screen controller 52 are used as an integral part of video monitor 44 instead of the conventional video monitor 44. The touch screen 50 and the touch screen controller 52 are connected to a video controller 54 and the processor 40. The player can make decisions and input signals into the processor 40 by touching the touch screen 50 at places representing the selections of the selection groups.

It should be appreciated that although the processor 40 and the memory device 42 are preferable implementations of the present invention, the present invention can also be implemented using one or more application-specific integrated circuits ("ASIC's") or other hard-wired devices, or using mechanical devices. Furthermore, although the processor 40 and memory device 42 preferably reside on each slot machine 10, it is possible to provide some or all of their functions at a central location such as a network server for communication to a playing station such as over a local area network ("LAN"), wide area network ("WAN"), Internet connection, microwave link, and the like. Such systems are also referred to herein as a processor.

Bonus Scheme Selection Groups

Figure 3:
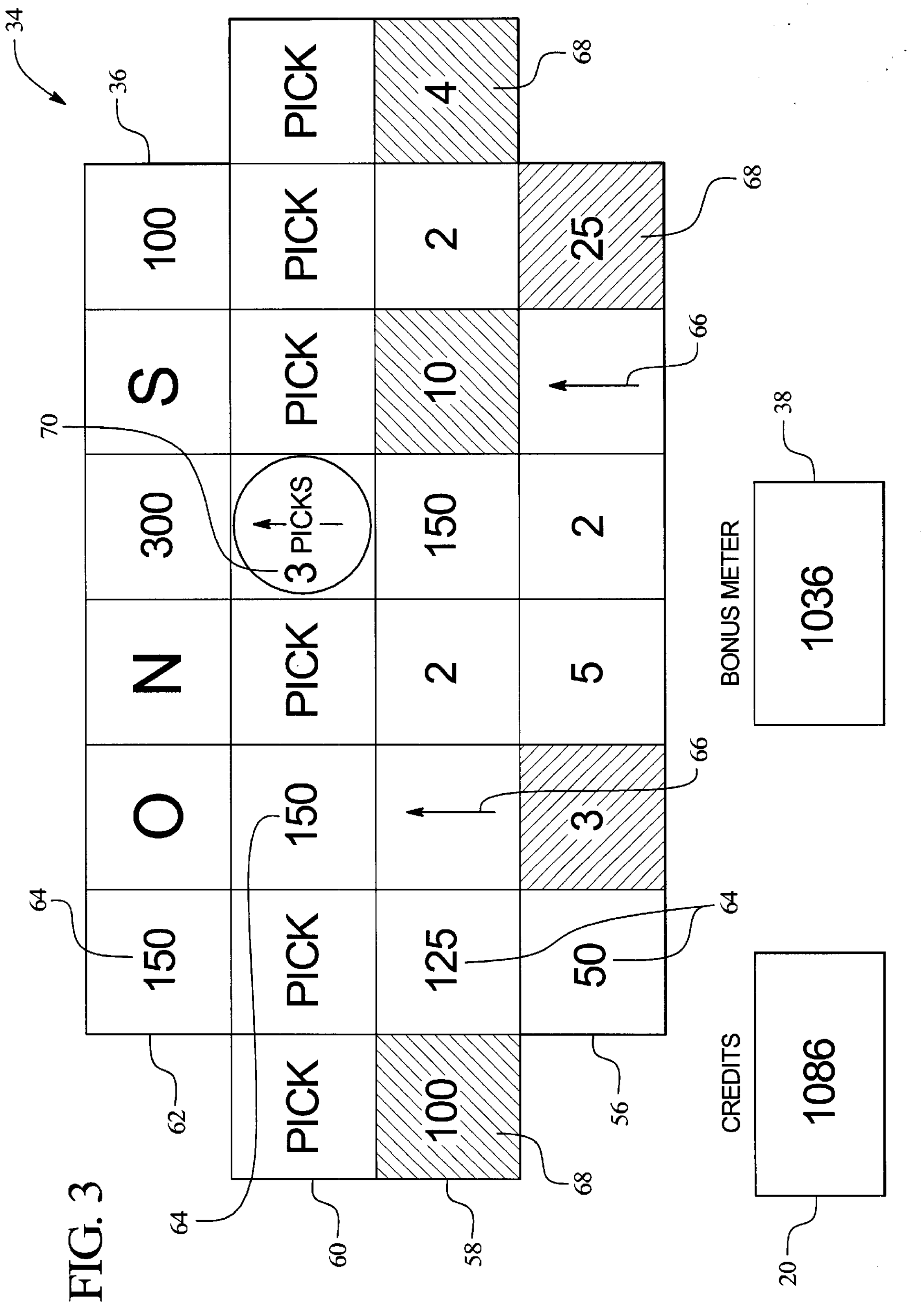
FIG. 3 is a front elevational view of a bonus display embodiment of the gaming device having a single screen with multiple selection groups.

FIG. 3 shows one embodiment of the bonus scheme 34 of the present invention, which includes all the selection groups in one display 36. In this embodiment, the selection groups are four adjacent horizontally extending rows of selections. The selection groups can have any configuration, but preferably, the game enhances player enjoyment during the bonus round by configuring the selection groups according to a predetermined game theme. In this embodiment, the display 36 is intended to emulate the game board from the popular television game show WHEEL OF FORTUNE™. WHEEL OF FORTUNE™ is a trademark of Califon Productions, Inc., Culver City Calif., used with permission by the assignee of the present invention.

Referring now to FIG. 1, each bonus round includes a plurality of selection groups, and the game initially masks or hides every selection of the selection groups with indicia, preferably conforming to the game theme, until the player selects and reveals the selection. FIG. 1 shows all the selections covered by letters making up the word "B—O—N—U—S" or by the word "PICK." The player does not know the content of a selection until picking it. In this embodiment the four selection groups are in one display 36, however, in another embodiment the selection groups appear in a plurality of displays, as described below.

FIG. 3 shows an example of a display 36 as it would appear after the player plays the bonus round. The display 36 contains four rows of selection groups 56, 58, 60 and 62. Each row or selection group has a plurality of selections (either masked or unmasked). Rows 56, 58, 60 and 62 all contain award indicators 64, having indicia corresponding to a number of credits or a multiplier value that the player receives for choosing the selection. The indicia are preferably numbers as shown but could also be a plurality of items such as fruits, bells, or bars, etc., the number of which represents a number of credits or a multiplier value. Rows 56, 58 and 60 also contain advance indicators 66 that point to another selection group and inform the player that the player may no longer select from the current selection group and must move to the next selection group. The embodiment in display 36 employs arrows that direct the player to advance to the selection group directly above the current selection group. Alternatively, the advance indicators may award credits or multipliers to a player as well as direct the player to the next selection group. In bonus round 34, the player begins in the bottom selection group 56 and advances upwardly until ending with the last selection group 62.

In FIG. 3, selection groups 56 and 58 contain a number of revealed selections 68 with angled hatching. The angled hatching designates selections that the player did not pick before choosing an advance indicator 66. It should be appreciated that to increase the enjoyment and excitement of the bonus round, the game may show the player the values the player could have chosen. This display could take place at the end of selecting from each selection group or at the end of the bonus round. Alternatively, the game could keep the selections masked as illustrated in selection groups 60 and 62. It should be appreciated that the game could reveal selections in any suitable manner.

Selection group 60 is the selection group before the final selection group 62. Selection group 60 preferably contains at least one picks indicator 70, which is preferably a number as shown but could also be any suitable symbol such as fruits, bells, or bars, etc. The picks number 70 represents the number of picks that the player will have from the final selection group 62. Preferably, selection group 60 contains more than one picks indicator 70 and one or more award indicators 64.

The picks indicator 70 includes indicia as shown in FIG. 3 with the word "picks". Also, the picks indicator may contain indicia that points to the final selection group, shown in FIG. 3 as an arrow, or may otherwise inform the player to move to the final selection group. In an alternative embodiment of the present invention, the game replaces the arrow of picks indicator 70 and the advance indicator 66 by changing the display 36.

In an alternative embodiment, the picks indicator 70 is replaced with an additional advance indicator, which directs the player to the final selection group. The additional advance indicator may also award the player credits or multipliers. The game randomly selects the number of picks that the player will have when the player reaches the final selection group at or before the time when the player selects the picks indicator. The game may determine the number of picks at the beginning of the bonus round or upon the picks indicator selection.

The final selection group 62 preferably contains only award indicators or multiplier values 64. The bonus round ends after the player makes the number of selections from the final selection group 62 equal to the picks indicator 70 in the selection group 60. In general, to increase player enjoyment, each selection group contains award indicators having, on average, higher values than the preceding selection group. The final selection group is preferably the most lucrative group, making the picks indicator 70 the key to the player's success in the bonus round 34. The higher the picks indicator, the more chances the player has to select from the lucrative final selection group 60.

As the player obtains award indicators 64, the bonus meter 38 tallies the selections. At the end of the bonus round 34, the bonus meter 38 will show the player the total credits earned during the bonus round. Preferably, the bonus meter does not tally the picks indicator value since this indicator does not represent game credits. In an alternative embodiment, the picks indicator 70 could also award credits as does the award indicator 64. Additionally, the game may provide a second credit display 20 in close proximity to the display 36 so that the player may easily see the player's total credits. Alternatively, the credit display 20 in close proximity to the display could be the only credit display that the game provides. It should be appreciated that neither the bonus meter 38 nor the credit display 20 are critical to the bonus round 34.

Bonus Round Sequence

Figure 4:
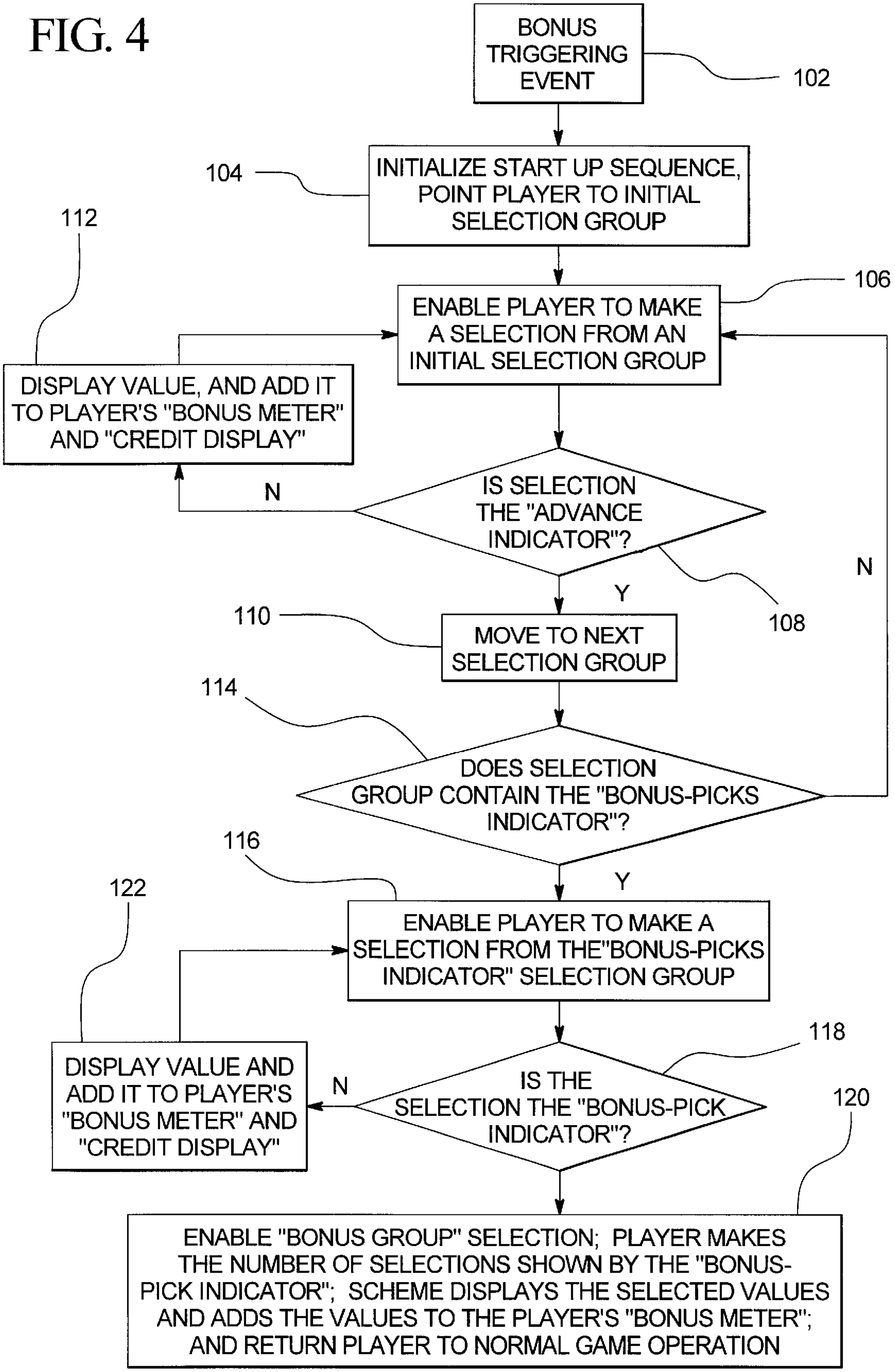
FIG. 4 is a flow diagram of the preferred embodiment of the bonus scheme of the present invention.

FIG. 4 illustrates the preferred embodiment. Upon a bonus round triggering event as indicated by block 102, the game preferably increases player enjoyment by showing the player an initialization of the bonus round as indicated by block 104. For instance, the game may leave the video monitor 44 or the touch screen 50 (FIG. 2) of the game blank until the triggering event occurs. Alternatively, the game could indicate that the display 36 (FIG. 3) is "thinking" of the indicators to place behind the masked selection groups 56, 58, 60 and 62. At the end of the initialization, the game directs the player to the initial or first selection group as indicated by block 104.

As described above with FIG. 3, the selection groups 56 and 58 contain a plurality of award indicators 64 and at least one advance indicator 66. The player chooses a masked selection from the selection group 56 as indicated by block 106. The game unmasks the selection and shows the player the indicator. If the selection is an advance indicator 66 as indicated by diamond 108, the player is directed to the next selection group as indicated by block 110. If the selection is not an advance indicator 66 as indicated by diamond .108, then the selection is preferably an award indicator 64. If so, the game displays the value of the award indicator and adds the value to the player's bonus meter 38 and credit display 20 as indicated by block 112 and enables the player to make another selection from the initial selection group as indicated by block 106.

The present invention contemplates using any suitable visible means to direct the player to make another selection from the current selection group such as highlighting the selection group until the game no longer enables the player to select from that group, at which time the game highlights the next selection group. Alternatively, the game may employ a separate "pick again" indicator that lights until the player makes another selection from the current selection group. The invention also contemplates using any suitable audible signals to direct the player to choose from a current selection group or otherwise to choose from another selection group.

The player will inevitably choose an advance indicator in the initial selection group as indicated by diamond 108. The player wants to prolong the selection process to accumulate as many credits as possible before advancement. Game excitement and enjoyment increases as the player selects from the selection groups because the odds of choosing the advance indicator 66 increases as the number of selections remaining in the selection group decreases. This distinguishes the final selection group described above with respect to FIG. 3, in which the number of picks is known before selecting from it.

After the player moves to the next selection group as indicated by block 110, the game determines if the selection group contains a picks indicator 70 (FIG. 3) as indicated by diamond 114. If not, then the selection group contains an advance indicator, and the game enables the player to proceed as before as indicated by block 106, diamond 108, block 110 and block 112. The present invention preferably enables the player to advance through any number of selection groups before reaching the last selection group. FIG. 3 shows three selection groups 56, 58 and 60 before the final selection group 62, however, the game could provide for any number of selection groups before the final selection group.

Upon reaching the selection group 60 containing a picks indicator 70 as indicated by diamond 114, the game enables the player to make a selection from this selection group as indicated by block 116. The game unmasks the selection and shows the player the indicator. If the selection is a picks indicator 70 as indicated by diamond 118, the player is directed to the final selection group 62 as indicated by block 120. If the selection is not a picks indicator as indicated by diamond 118, then the selection preferably is an award indicator 64. If so, the game displays the value of the award and adds the value to the player's bonus meter 38 and credit display 20 as indicated by block 122 and enables the player to make another selection from the selection group as indicated by block 116.

The player will inevitably select a picks indicator from a selection group as indicated by diamond 118. The player wants to prolong the selection so as to accumulate as many credits as possible before advancement. Game excitement and enjoyment increases as the player selects from the selection group 60 (having the picks indicator) because the odds of choosing a picks indicator increases as the number of remaining selections decreases.

Upon selecting the picks indicator 70 as indicated by diamond 118, the game enables the player to make selections from the final selection group 62 as indicated by block 120. As stated earlier, the picks indicator 70 represents the number of picks that the player will have from the final selection group 62. When the player makes the predetermined number of selections, the game unmasks the award indicators 64 and shows the player the values. The game adds the values to the player's bonus meter 38 and credit display 20 and ends the bonus round 34 by returning the player to normal game operation.

Selecting from the final selection group 62 of the bonus round 34 involves making the predetermined number of selections. The object is to choose the most valuable indicators in the final selection group 62. When the player finishes making the selections, the game may reveal the unselected selections, as described above, to increase player enjoyment. When the bonus round 34 ends, the game resets the bonus round by blanking the video monitor 44 or the touch screen 50 (FIG. 2) or by otherwise masking the indicators of selection screen 36.

In one example illustrated by FIG. 3, a player playing a slot machine enters a bonus round when a set of reels of the gaming machine displays "BONUS", "BONUS" and BONUS." The game initializes the bonus round 34 and directs the player to the initial selection group 56. The player randomly selects the "5", the "50", the "2", and finally the advance indicator 66. As the player selects the "5", "50" and the "2", the bonus meter 38 continuously updates the player's bonus round credits, "5", "55" and "57", respectively. Assuming the player had 50 credits before entering the bonus round, the credit display 20 continuously updates the player's total game credits, "55", "105" and "107," respectively. The bonus meter and credit display remain active throughout the bonus round.

When the player selects the advance indicator 66, the game reveals the "3" and the "25" to the player as unselected award indicators and lost opportunities. The advance indicator 66 directs the player to selection group 58, and the game enables the player to select from that group. The player randomly selects the "2", the 125", the "2", the "150", and finally the advance indicator 66. The advance indicator 66 directs the player to selection group 60, and the game shows the player the unselected "100", "10" and the "4" and enables the player to select from selection group 60. The player randomly selects the "150" and the "3picks" picks indicator. In this example, the unselected indicators remain masked, however, the present invention could alternatively display the remaining unselected picks indicators and awards.

When the player selects the picks indicator 70, the indicator directs the player to the final selection group 62, and the game enables the player to select from that group. The player randomly makes the predetermined three picks "300", "150" and "100", and the game adds the values to the bonus meter and credit display, ending the bonus round 34. The bonus meter 38 and the credit display 20 show the accumulated bonus round credits "1036" and "1086" assuming, as before, that the player had 50 credits before entering the bonus round. In this example, the unselected indicators remain masked, however, the present invention could alternatively reveal the remaining unselected final selection group awards.

Multiple Display Embodiment

Figure 5:
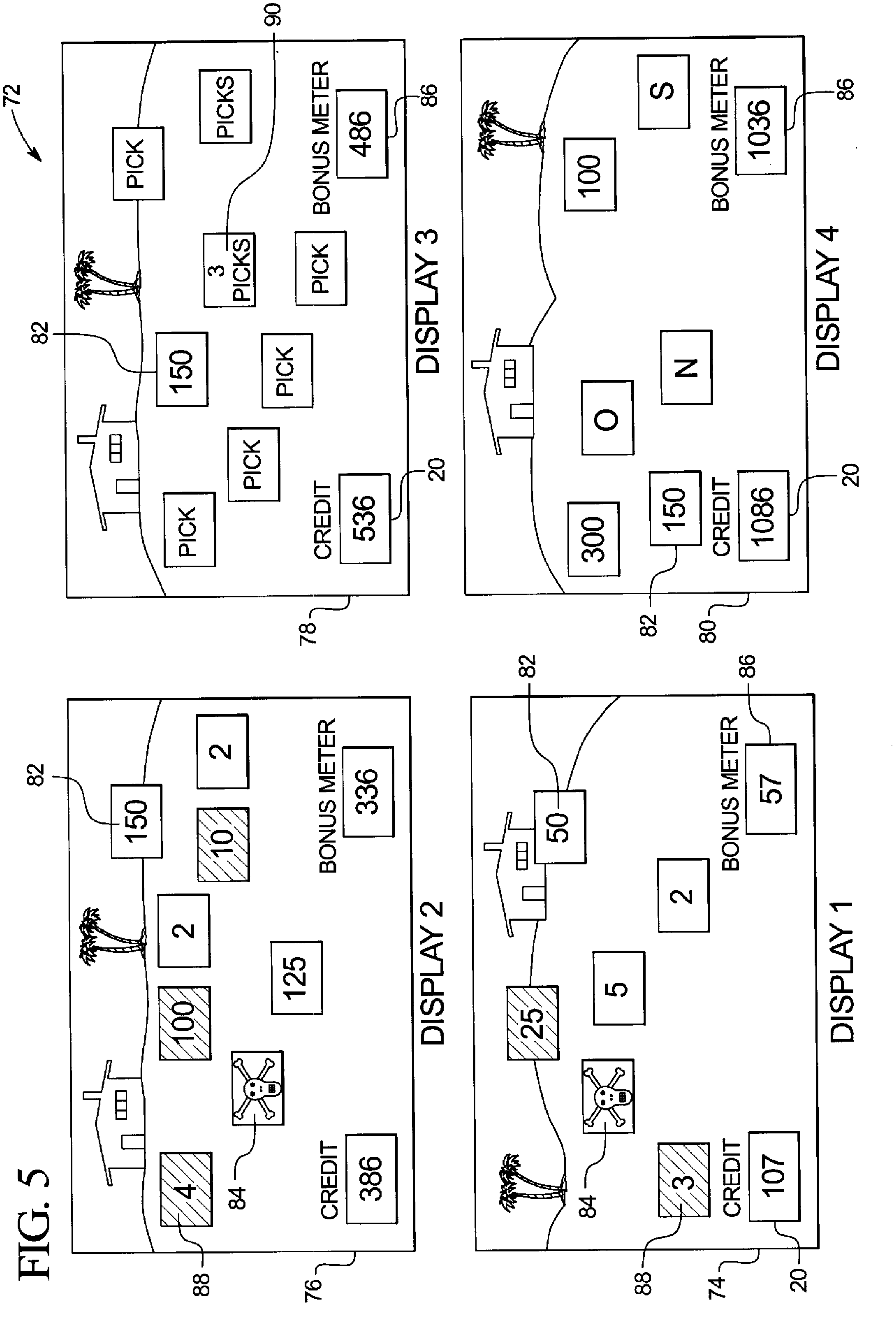
FIG. 5 is an illustration of the sequence of an alternative embodiment of the gaming device having multiple screens, wherein each screen contains a selection group.

FIG. 5 illustrates another embodiment of the bonus scheme 72, which is identical in function to bonus scheme 34 except that it places the selection groups into a plurality of separate displays. In this embodiment, the selection groups are contained in the four separate displays 74, 76, 78 and 80. The video monitor 44 or the touch screen 50 (FIG. 2) shows one display and thus one selection group at a time. Alternatively, any screen could contain more than one selection group. As before, the game enhances player enjoyment during the bonus round by configuring the selection groups according to a predetermined game theme. In this embodiment, the displays 74, 76, 78 and 80 depict spooky graveyard scenes. The game can further enhance game excitement and enjoyment by varying the screens to match the intensity and potential game credit value of the displayed selection group.

In this embodiment, upon a bonus triggering event, the game provides an initial selection group or display 74, which contains a plurality of hidden indicators. If the display 74 contains more than one selection group, the game directs the player to the initial selection group.

The initial displays 74 and 76 contain a plurality of award indicators 82 and at least one advance indicator 84. The player chooses a masked selection from an initial selection group. The game unmasks the selection and shows the player the indicator. If the selection is an advance indicator 84, the player is directed to the next display. If the selection is not an advance indicator 84, then the selection is preferably an award indicator 82. If so, the game displays the value of the award and adds the value to the player's bonus meter 86 and credit display 20 and enables the player to make another selection from the initial selection group 74.

As indicated above, the present invention contemplates using any suitable visible means to direct the player to make another selection from the current selection group. When a single display only contains one selection group, the player will intuitively select from the display until the game changes the display. In such a case, and especially for embodiments where a single display contains multiple selection groups, the game preferably highlights the selection group until the game no longer enables the player to select from that group, at which time the game highlights the next selection group. Alternatively, the game employs a separate "pick again" indicator that lights until the player makes another selection from the current selection group. The invention also contemplates using any suitable audible signals to direct the player to choose from a current selection group or otherwise to choose from another selection group.

After the player moves to the next selection group in another display, the game determines if the display contains a picks indicator 90. If not, then the display preferably contains an advance indicator 84, and the game enables the player to proceed as before. FIG. 5 shows two initial displays 74 and 76, however, the game could provide any number.

Upon reaching the display 78 containing a picks indicator 90, the game enables the player to make a selection from this display. The game unmasks the indicator and shows the player the selection. If the selection is a picks indicator 90, the player is directed to the final selection display 80. If the selection is not a picks indicator, then the selection is preferably an award indicator 82. If so, the game displays the value of the award and adds the value to the player's bonus meter 86 and credit display 20 and enables the player to make another selection from the award display.

Upon selecting the picks indicator 90, the game enables the player to make selections from the final selection display 80. As stated earlier, the picks indicator 90 represents the number of picks that the player will have from the final selection display 80. When the player makes the predetermined number of selections, the game unmasks the award indicators 82 and displays the values to the player. The game adds the values to the player's bonus meter 86 and credit display 20 and ends the bonus round 72 by returning the player to normal game operation.

FIG. 5 also illustrates an example of a player playing a bonus round. The game initializes the bonus round 72 and directs the player to the initial selection group 74. The player randomly selects the "5", the "50", the "2" and finally the advance indicator 84, a skull and cross bones indicating the death of this display. As the player selects the "5", "50" and the "2", the bonus meter 86 continuously updates the player's bonus round credits, "5", "55" and "57", respectively. Assuming the player had 50 credits before entering the bonus round, the credit display 20 continuously updates the player's total game credits, "55", "105" and "107", respectively. The bonus meter and credit display remain active throughout the bonus round.

In the multiple display embodiment, the present invention contemplates the bonus meter 86 operating two ways. In one way, the bonus meter accumulates the bonus credits "57", "336", "486" and "1036" as the player proceeds through the bonus round 72 as shown. In another way, the bonus meter 86 accumulates the bonus credits display by display, so that the game resets the bonus meter when the game changes displays. The bonus meter 86 would display "57", "279", "150" and "550." The present invention could also provide both types of bonus meters.

When the player selects the advance indicator 84 of display 74, the game reveals the "3" and the "25" to the player as unselected indicators and lost opportunities. The game either displays the next display 76, as in this example, or directs the player to another selection group within display 74. In either case, the game enables the player to select from the next selection group. The player randomly selects the "2", the 125", the "2", the "150" and finally the advance indicator 84 of display 76. The game reveals the unselected "100", "10" and the "4" in display 76 and then enables the player to select from display 78. The player randomly selects the "150" and the "3 picks" picks indicator 90. In this example, the unselected selections remain masked, however, the present invention could alternatively display the remaining unselected picks indicators and awards.

When the player selects the picks indicator 90, the game advances to the final selection display 80, and the game enables the player to select from that display. The player randomly makes the predetermined three picks "300", "150" and "100", and the game adds the values to the bonus meter and credit display, ending the bonus round 72. The bonus meter 86 and the credit display 20 show the accumulated bonus round credits "1036" and "1086" assuming, as before, that the player had 50 credits before entering the bonus round. The unselected indicators remain masked, however, the present invention could alternatively reveal the remaining unselected final selection group awards.

Alternative Picks Indicator Embodiment

Figure 6:
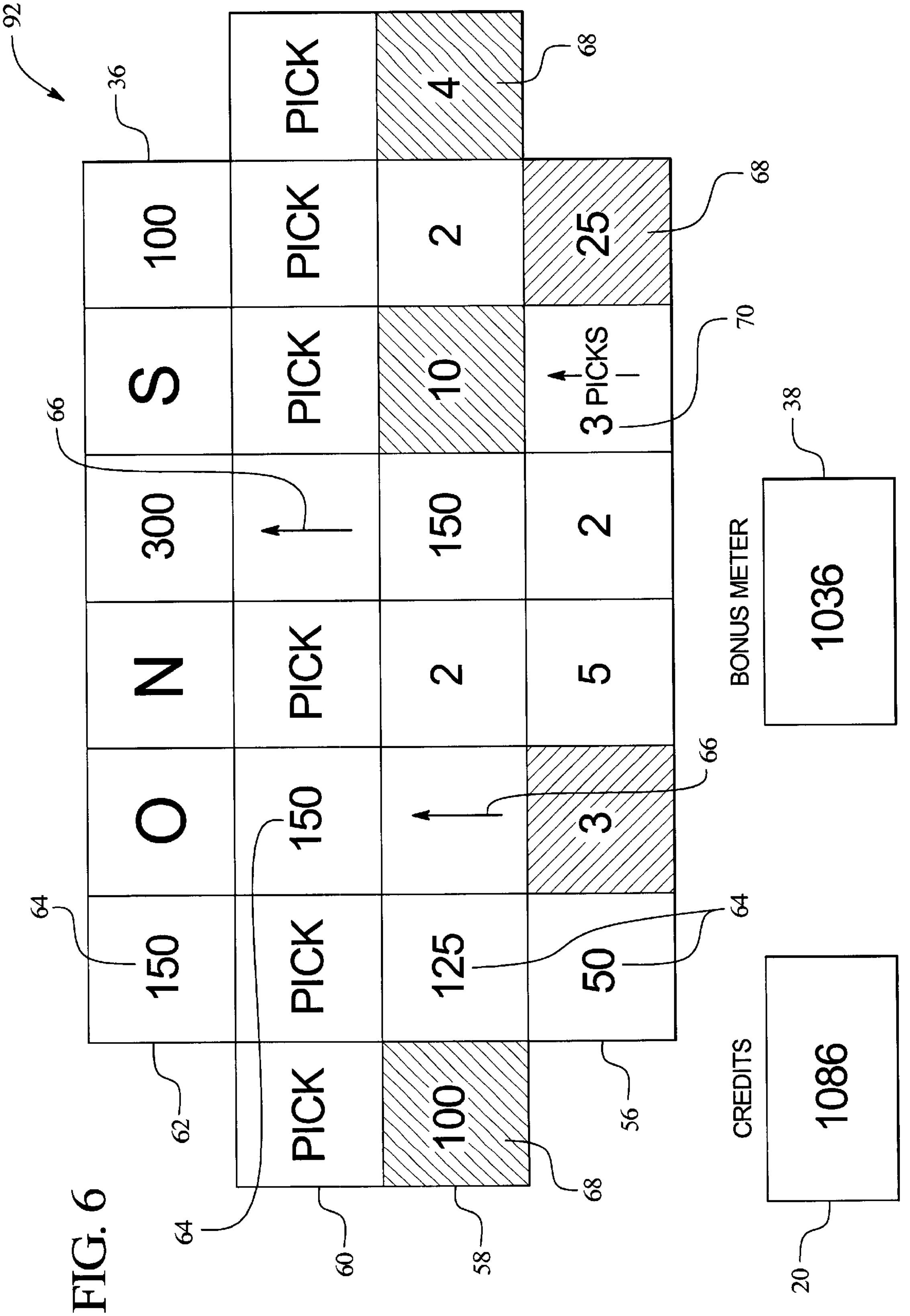
FIG. 6 is a front elevational view of a bonus display of an alternative embodiment of the gaming device, wherein the picks indicator is chosen before the player reaches the next to last selection group.

FIG. 6 illustrates another embodiment of the bonus scheme 92, in which the player selects the picks indicator 70 from a selection group 56 that is not displayed immediately prior to the display of the final selection group 62. For illustration purposes, this embodiment is shown in connection with the single display embodiment 36, however, this embodiment could contain more than one display. In this embodiment the player advances upward through adjacent horizontal selection groups 56, 58, 60 and 62 as before, except now the player learns the number of final selection group picks earlier in the bonus round. It should be appreciated that picks indicator 70 could be also be placed in any initial selection group, such as selection group 58. The bonus meter 20 and credit display 38 operate as described above.

Alternative Multiple Picks Indicator Embodiment

Figure 7:
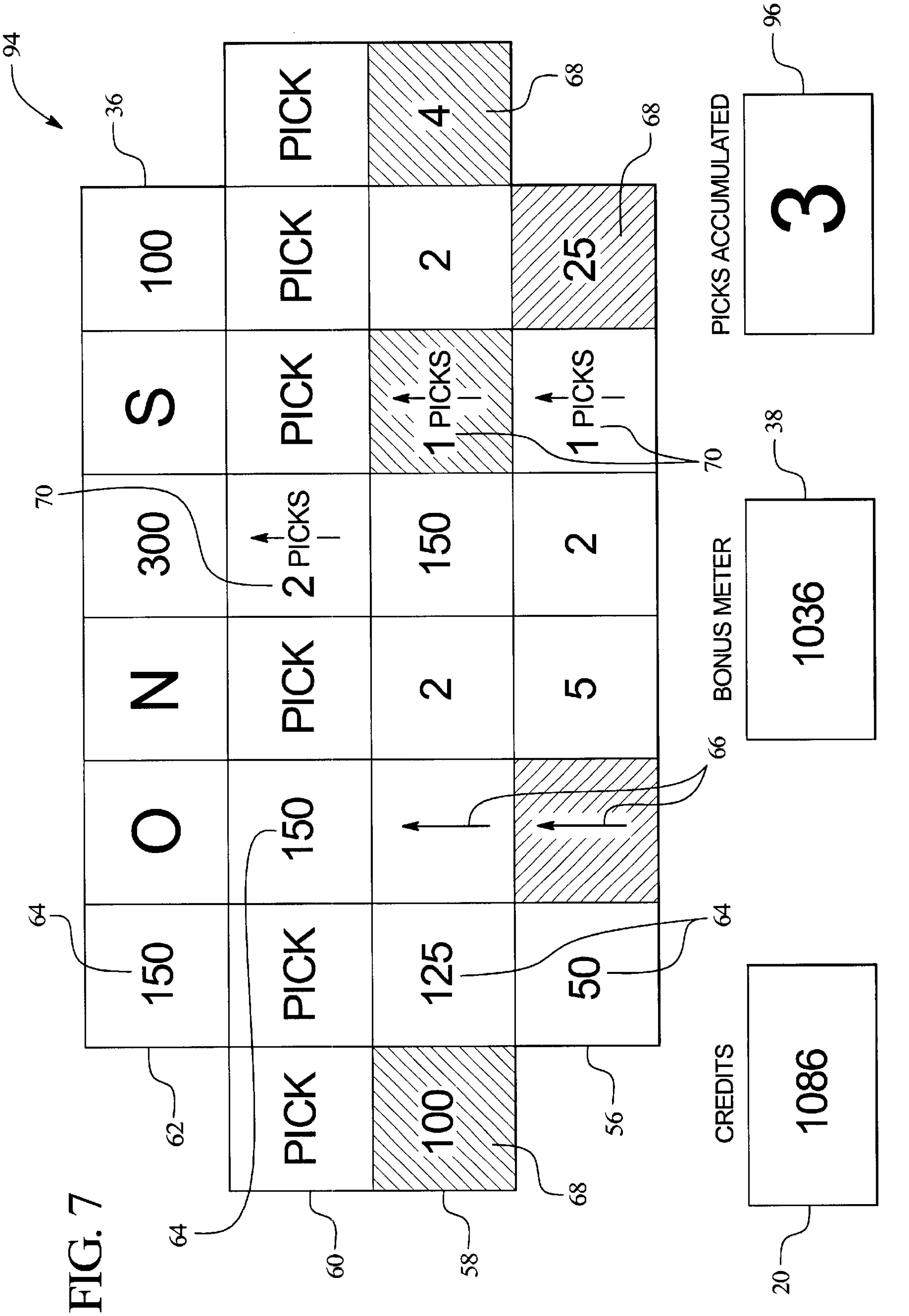
FIG. 7 is a front elevational view of a bonus display of an alternative embodiment of the gaming device, wherein the player can choose picks indicators from more than one selection group.

FIG. 7 illustrates another embodiment of the bonus scheme 94, in which the player selects picks indicators 70 from a plurality of selection groups. In this example, all the selection groups 56, 58 and 60 other than the final selection group 62 contain picks indicators 70. However, not all selection groups would have to contain picks indicators. For illustration purposes, this embodiment is shown in connection with the single display embodiment 36, however, this embodiment could contain more than one display.

The selection groups could contain both picks indicators and advance indicators as shown by selection group 58. It should be appreciated that the player would accumulate credits from the group 58 by choosing award indicators 64 until choosing either the advance indicator 66 or the picks indicator 70. The game accumulates the final selection group picks until the player finally reaches the final selection group. In this example, the player achieved one final selection round pick from the selection group 56, none from the selection group 58, and two from the selection group 60, totaling three. The game could provide a separate "picks meter" 96 to display the player's total number of final selection group picks as the player accumulates them.

Multiple Round Embodiment

Figure 8:
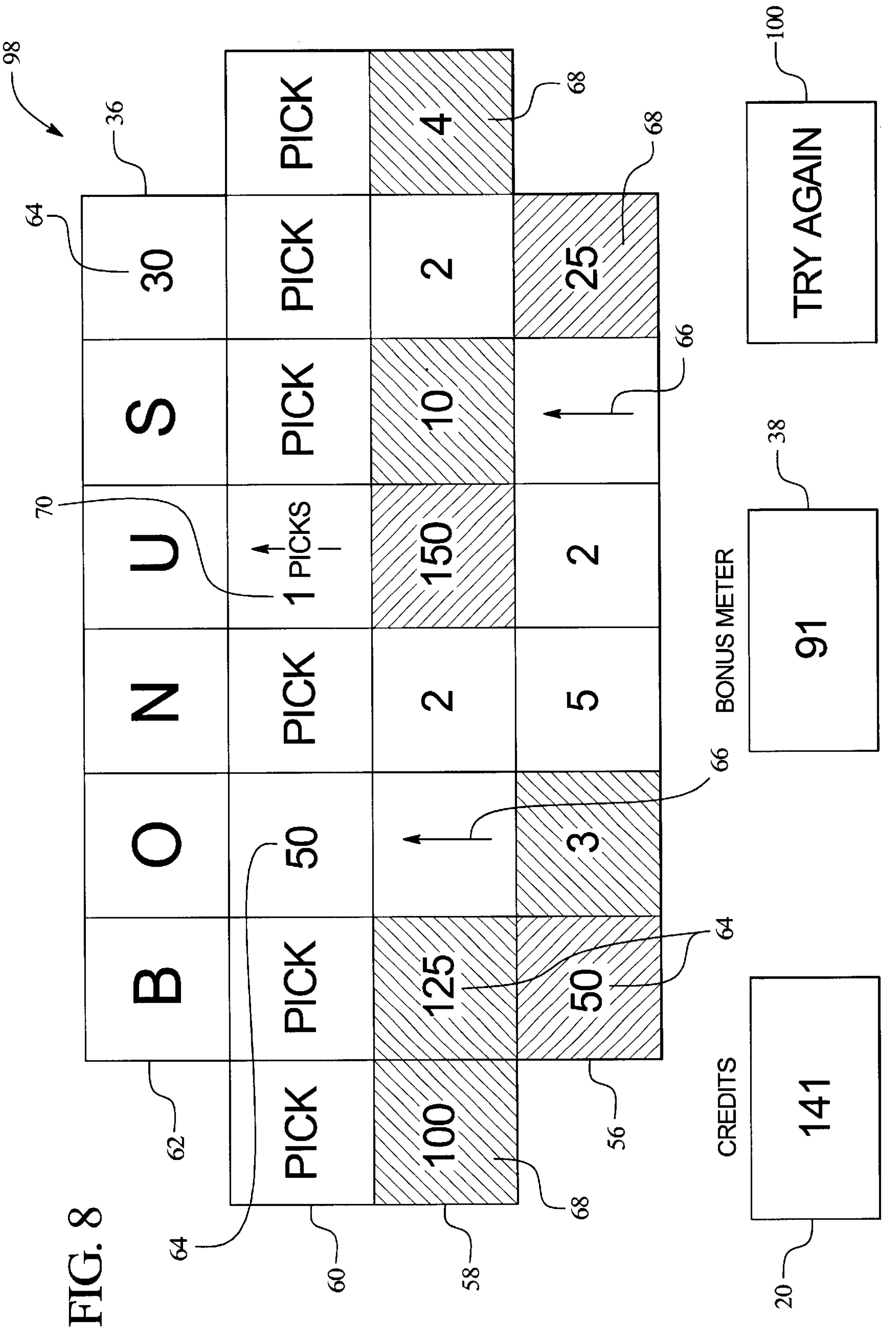
FIG. 8 is a front elevational view of a bonus display of an alternative embodiment of the gaming device, wherein the game enables the player to "try again" upon the occurrence of an event.

FIG. 8 illustrates another embodiment of the bonus scheme 98, in which the game enables the player to "try again" when an event occurs. The implementor can choose any event to trigger the try again feature. For example, the game could enable the player to try again when the round ends after a predetermined number of picks. Another example would be when, at the end of the bonus round, the player's accumulated credits are below a predetermined lower limit. The bonus round does not terminate upon selection from the final selection group when, for example, the player does not accumulate at least one hundred credits as shown in FIG. 8. The game would display a "try again" message 100 or some other suitable means to inform the player that the bonus round is continuing.

Depending upon the triggering event, the game could reset the player's award accumulation to zero before repeating the bonus round. Alternatively, the game could add the award accumulated in the repeated round to the previously accumulated award. Preferably, the player receives a greater award after playing the repeated round. In the examples above, the game would preferably add to the player's previously accrued award when a predetermined number of picks triggers the repeat. In this case, the player may well have accumulated a desirable award and would not want the game to reset the award. Alternatively, when the triggering event is a player's award having a value less than a predetermined threshold, the repeat round ensures the player of obtaining a higher award by resetting the deficient award to zero and starting over until surpassing a threshold level.

This embodiment could enable the player to start over at any point in the bonus round, including the final selection group where the number of picks is known. The controller of the present invention could determine a new set of random positions and values for the selections of the various selection groups. Also, the game could re-mask all the selections and enable the player to choose any selection or, alternatively, only enable the player to choose from unselected selections that are still masked with indicia such as the "pick" indicia of selection group 60 of FIG. 8. The game could enable the player to replay the entire bonus round, only enable the player to select from the final selection group, or to play any portion of the bonus round.

It should also be appreciated that this embodiment could be used in conjunction with the single display embodiment 36, as shown here, or the multiple display embodiment shown in FIG. 5. It should also be appreciated that every embodiment of the present invention ultimately terminates with a final selection group that contains only award indicators or multipliers.

Accept/Reject Embodiment

A further embodiment of the present invention enables the player to accept or reject a pick from the final selection group. The sequence of operation is the same as in FIG. 4, until the player selects the bonus pick indicator as determined in diamond 118. Upon selecting a bonus pick indicator, the game determines whether the player has an accept/reject option. The ways in which a player may obtain an accept/reject option are discussed below. If the player does not have an accept/reject option, the game proceeds as in the earlier embodiment of FIG. 4 as shown in block 120. If the player has an accept/reject option, the game enables the player to make a single bonus group selection and displays the selection.

Next, the game determines whether the player still has an option. If not, the game accepts the pick and adds its value to the player's bonus. If the player does have an option left, the game determines if the player wishes to keep or reject the pick. The game preferably provides a suitable keep or a reject button or has the player press the pick to accept it. The invention contemplates other suitable forms of inputting acceptance, such as providing remote pushbuttons.

If the player decides to reject the pick (i.e., exercises option), the game selects and displays a new value to the player, or alternatively, enables the player to pick another bonus pick from the bonus group. The player proceeds in this manner until the player has no more options or no longer wishes to exercise the change value option, at which point the game accepts the displayed value. If the player has another pick from the final selection group, the game allows the player to make another selection. If not then the game ends the bonus round.

The player may receive any number of accept/reject options in a variety of ways. The present invention contemplates randomly choosing and displaying a number of options. The player can receive the options as the player plays the bonus round (i.e., in the initial selection groups). The game can also randomly prompt the player to accept or reject after certain predetermined selection picks. Alternatively, the player can receive the option during the normal operation of the gaming device.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention is hereby claimed as follows:

1. A gaming device having a bonus round comprising:

a selection group having a plurality of selections wherein at least one selection is an award indicator and at least one selection is a picks indicator;

a final selection group having a plurality of selections wherein at least one selection is an award indicator; and a display device adapted to display the selections to a player, whereby the picks indicator determines the number of selections the player may choose in the final selection group.

2. The gaming device of claim 1, wherein the selections in said selection group include a plurality of award indicators.

3. The gaming device of claim 1, wherein the selections in said selection group include a plurality of picks indicators.

4. The gaming device of claim 1, wherein the selections in the final selection group include a plurality of award indicators.

5. The gaming device of claim 1, wherein all of the selections in the final selection group are award indicators.

6. The gaming device of claim 1, which includes a plurality of selection groups.

7. The gaming device of claim 6, wherein said plurality of selection groups each have a plurality of selections.

8. The gaming device of claim 6, wherein at least one of the selection groups includes selections with at least one award indicator and at least one advance indicator.

9. The gaming device of claim 8, wherein said at least one selection group includes selections with a plurality of award indicators.

10. The gaming device of claim 8, wherein the advance indicator upon being selected has an advance outcome and an award outcome.

11. The gaming device of claim 6, wherein said each of said plurality of selection groups have a plurality of selections with a plurality of award indicators and at least one advance indicator.

12. The gaming device of claim 6, wherein said selection groups and said final selection groups are displayed in a plurality of displays.

13. The gaming device of claim 6, wherein said selection groups include a plurality of pick indicators.

14. The gaming device of claim 6, wherein at least one of said selection groups includes at least one advance indicator and at least one picks indicator.

15. The gaming device of claim 6, wherein one of the selection groups that directly precedes the final selection group includes the picks indicator.

16. The gaming device of claim 1, wherein said selection group and said final selection group are displayed in a single display.

17. The gaming device of claim 1, wherein said selection group and said final selection group are displayed in separate displays.

18. The gaming device of claim 1, which further includes means for repeating the bonus round upon the occurrence of a predetermined event.

19. The gaming device of claim 18, wherein the predetermined event is the player's accumulated award having a value below a predetermined value.

20. The gaming device of claim 1, wherein said award indicators represent gaming device credits.

21. The gaming device of claim 1, wherein said award indicators represent multipliers.

22. The gaming device of claim 1, wherein said picks indicator displays the number of selections the player may choose in the final selection group.

23. The gaming device of claim 1, wherein the selection group includes an advance indicator.

24. The gaming device of claim 1, wherein the picks indicator upon being selected terminates player selection from said selection group.

25. The gaming device of claim 1, wherein the picks indicator upon being selected begins player selection from said final selection group.

26. The gaming device of claim 1, wherein the picks indicator upon being selected yields an award to the player.

27. The gaming device of claim 1, which includes means for enabling the player to accept or reject an outcome of a selection from said final selection group.

28. A gaming device having a bonus round comprising:

a selection group having a plurality of selections wherein at least one selection is an advance indicator and one selection is an award indicator;

a final selection group having a plurality of selections wherein at least one selection is an award indicator;

a picks indicator associated with at least one selection in the selection group; and a display device adapted to display the selections and the picks indicator to a player, wherein the picks indicator determines the number of selections the player may choose in the final selection group.

29. A method for playing a bonus round of a gaming device, said method comprising the steps of:

(a) triggering said bonus round;

(b) displaying a selection group having a plurality of selections wherein at least one selection is an award indicator and one selection is a picks indicator having a picks number;

(c) displaying a final selection group having a plurality of selections wherein at least one selection is an award indicator;

(d) enabling the player to choose selections from the selection group until the player obtains a picks indicator;

(e) displaying the selections chosen by the player;

(f) awarding the player the value for each award indicator chosen by the player prior to choosing the picks indicator;

(g) displaying the picks number of the picks indicator when the picks indicator is chosen by the player;

(h) enabling the player to choose a number of selections in the final selection group which is equal to the picks number of the chosen picks indicator; and (i) displaying and awarding the player the value of each award indicator chosen by the player in the final selection group.

30. The method of claim 29, which includes the step of displaying a plurality of selection groups containing at least one award indicator and at least one advance indicator.

31. The method of Claim 30, which includes the step of enabling the player to choose selections in said selection groups having at least one advance indicator until said player selects said advance indicator.

32. The method of claim 31, which includes displaying and awarding the player the value of each award indicator chosen by the player.

33. The method of claim 30, wherein said selection groups include selections having at least one advance indicator with a picks number, wherein the player chooses selections until said player selects an advance indicator with the a picks number.

34. The method of claim 30, wherein the selection groups and the final selection group are displayed in a single display.

35. The method of claim 30, wherein the selection groups and the final selection group are displayed on separate displays.

36. The method of claim 30, which includes awarding said player at least one chance to accept or reject said final selection group selection while said player chooses from one of the selection groups having an advance indicator.

37. The method of claim 29, wherein the selection group containing at least one picks indicator and the final selection group are displayed in a single display.

38. The method of claim 29, wherein the selection group containing at least one picks indicator and the final selection group are displayed in separate displays.

39. The method of claim 29, which includes repeating steps (b) through (i) upon the occurrence of a predetermined event.

40. The method of claim 39, which includes adding an award from a repeating round to said player's previously accumulated award.

41. The method of claim 29, which includes repeating steps (h) through (i) upon the occurrence of a predetermined event.

42. The method of claim 29, which includes repeating the steps (b) through (i) if the player's accumulated award has a value below a predetermined value.

43. The method of claim 42, which includes resetting said player's accumulated award to zero before repeating.

44. The method of claim 29, which includes enabling said player to accept or reject at least one selection from the final selection group.

45. The method of claim 44, which includes prompting said player to accept or reject said selection after making said selection.

46. The method of claim 44, which includes randomly generating a number of selections that said player can accept or reject.

47. The method of claim 29, which is operated through a data network.

48. The method of claim 47, wherein the data network is an internet.

49. A method for playing a bonus round of a gaming device, said method comprising the steps of:

(a) triggering said bonus round;

(b) displaying a selection group having a plurality of selections wherein at least one selection is an award indicator and at least one selection is a picks indicator;

(c) displaying a final selection group having a plurality of selections wherein at least one selection is an award indicator having a value;

(d) enabling the player to choose selections from the selection group until the player obtains a picks indicator;

(e) displaying the selections chosen by the player;

(f) awarding the player the value for each award indicator chosen by the player prior to choosing the picks indicator;

(g) randomly generating a number of picks before or at the time when the picks indicator is chosen by the player;

(h) enabling the player to choose a number of selections in the final selection group which is equal to the number of picks;

(i) displaying and awarding the player the value of each award indicator chosen by the player in the final selection group; and (j) ending the bonus round.

50. A method of operating a gaming device, said method comprising:

(a) displaying a first selection group having a plurality of selections, wherein at least one selection is an award indicator and at least one selection is a picks indicator;

(b) enabling a player to choose selections from said first selection group until the player obtains the picks indicator, the picks indicator informing the player of a number of picks the player has in a second selection group; and (c) enabling the player to choose said number of picks of selections from the second selection group.

51. The method of claim 50, wherein the second selection group is a final selection group.

52. The method of claim 50, which includes enabling the player to choose selections from at least one intermediate selection group occurring between said first and second selection groups.

53. The method of claim 50, which includes enabling the player to choose selections from at least one preliminary selection group, before enabling selection from said first selection group.

54. The method of claim 50, which includes determining whether to let the player accept or reject at least one of the selections from the second selection group.

55. The method of claim 50, which includes enabling the player accept or reject a selection from the second selection group.

56. The method of claim 55, which includes enabling the player to choose an additional selection if the player rejects the selection.

57. The method of claim 50, which includes determining whether to let the player choose at least one additional selection after the player makes the number of selections from the second selection group.

58. The method of claim 57, wherein the at least one additional selection is from the second selection group.

59. The method of claim 50, which is operated through a data network.

60. The method of claim 59, wherein the data network is an internet.

61. A method of operating a gaming device, said method comprising:

(a) enabling a player to choose selections from a first group until the player selects an advance indicator;

(b) enabling the player to choose selections from a second group until selecting a picks indicator, the picks indicator indicating a number of picks the player has from a third selection group; and (c) enabling the player to choose said number of picks of selections from the third selection group.

62. The method of claim 61, which includes enabling the player to choose from the second selection group before enabling selection from the first selection group.

63. The method of claim 61, which includes providing steps (a) to (c) on a server capable of being accessed by a plurality of player gaming stations.

64. The method of claim 61, which includes providing the player an award as a result of at least one of: selections made in the first selection group before selecting the advance indicator; selecting the advance indicator; selections made in the second selection group before selecting the picks indicator; selecting the picks indicator; and selections made in the third selection group.

65. The method of claim 64, which is operated through a data network.

66. The method of claim 65, wherein the data network is an internet.

67. A gaming device having a game comprising:

a first selection group in the game having a plurality of selections and a picks indicator associated with one of the selections; and a second selection group in the game having a plurality of selections, wherein a player can make a number of selections in the second selection group based on the number provided to the player by the player's selection of the picks indicator.

68. The gaming device of claim 67, wherein the second selection group is a final selection group.

69. The gaming device of claim 67, wherein the selection associated with the picks indicator is player selectable.

70. The gaming device of claim 67, wherein the second selection group has a different number of selections than the first selection group.

71. The gaming device of claim 67, which includes a third selection group that has a different number of selections than the first selection group.

72. A gaming device comprising:

a plurality of first selection groups having award indicators and advance indicators;

at least one second selection group having award indicators and a picks indicator associated a choice by a player; and a third selection group in which the player can choose a number of selections determined by the picks indicator.

* * * * *

UNITED STATES PATENT AND TRADEMARK OFFICE
CERTIFICATE OF CORRECTION

PATENT NO. : 6,439,995 B1
DATED : August 27, 2002
INVENTOR(S) : Hughs-Baird et al.

It is certified that error appears in the above-identified patent and that said Letters Patent is hereby corrected as shown below:

Column 6,
Line 4, change "electromechanical" to -- electro-mechanical --.

Column 8,
Line 36, change ".108" to -- 108 --.

Column 16,
Line 33, change "the a" to -- a --.

Column 17,
Line 63, change "player accept" to -- player to accept --.

Column 18,
Line 5, change "the at" to -- at --.
Line 62, change "associated" to -- associated with --.

Signed and Sealed this

Fourth Day of February, 2003

JAMES E. ROGAN
*Director of the United States Patent and Trademark Office*